United States Patent
Meloche (10) Patent No.: US 8,462,634 B2
(45) Date of Patent: Jun. 11, 2013

(54) SYSTEM AND METHOD FOR AUTOMATICALLY ADAPTING AUDIO PACKET MARKING IN A PACKET NETWORK

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 390 days.

(21) Appl. No.: 12/827,674

(22) Filed: Jun. 30, 2010

(65) Prior Publication Data

US 2011/0211450 A1 Sep. 1, 2011

Related U.S. Application Data

(60) Provisional application No. 61/309,192, filed on Mar. 1, 2010, provisional application No. 61/312,498, filed on Mar. 10, 2010.

(51) Int. Cl.
*G01R 31/08* (2006.01)
*H04L 12/28* (2006.01)
*H04J 3/24* (2006.01)
*H04J 3/18* (2006.01)

(52) U.S. Cl.
USPC ...... 370/236; 370/252; 370/395.21; 370/474; 370/477; 709/232

(58) Field of Classification Search
USPC ................ 370/230–233, 236, 252, 389, 392, 370/395.21, 474, 477; 709/232, 233, 234
See application file for complete search history.

(56) References Cited

U.S. PATENT DOCUMENTS

| | | | |
|---|---|---|---|
| 6,822,940 B1 * | 11/2004 | Zavalkovsky et al. | 370/237 |
| 7,167,451 B1 * | 1/2007 | Oran | 370/252 |
| 8,165,024 B2 * | 4/2012 | Dolganow et al. | 370/237 |
| 2007/0189327 A1 * | 8/2007 | Konda | 370/466 |
| 2008/0089324 A1 * | 4/2008 | Polk et al. | 370/389 |
| 2008/0310307 A1 * | 12/2008 | Yeom | 370/235 |
| 2009/0034426 A1 * | 2/2009 | Luft et al. | 370/252 |
| 2011/0019556 A1 * | 1/2011 | Hsin et al. | 370/252 |

* cited by examiner

*Primary Examiner* — Michael Thier
*Assistant Examiner* — Redentor Pasia

(57) ABSTRACT

Disclosed herein are systems, methods, and computer-readable storage media for managing a packet network to deal with a problem of dropped audio packets. A triggering event signal indicates that audio marked packet traffic in the packet network has exceeded a capacity limit. Upon receiving the triggering event signal, a transmitting device transmits audio packets marked as non-audio packets through the packet network. The transmitting device, for example, is a VoIP telephone. The triggering event signal, for example, is generated when the audio marked packet traffic exceeds a dropped packet threshold, or when monitoring of audio marked packet traffic indicates that audio marked packet traffic approaches a committed data rate (CDR) threshold.

15 Claims, 10 Drawing Sheets

SYSTEM AND METHOD FOR AUTOMATICALLY ADAPTING AUDIO PACKET MARKING IN A PACKET NETWORK

RELATED APPLICATIONS

This application claims the benefit of U.S. Provisional Application No. 61/309,192, filed 1 Mar. 2010, and the benefit of U.S. Provisional Application No. 61/312,498, filed 10 Mar. 2010, each of which is incorporated herein by reference in its entirety.

BACKGROUND

1. Technical Field

The present disclosure relates to network management and more specifically to handling audio traffic when the audio traffic approaches a committed data rate (CDR).

2. Introduction

In packet networks, packets can be marked for processing. Such markings can identify a packet as an audio packet, video packet, or data packet. Typically network infrastructure grants an audio packet the highest priority, followed by video packets and then data packets. A problem arises when the audio traffic approaches a committed data rate (CDR) for audio packets in the network. If the overall audio marked packet traffic exceeds the CDR for audio packets, then the network drops packets in excess of the CDR. Audio transmission quality is especially susceptible to dropped packets.

To avoid dropped audio packets, a packet network typically includes a Communications Manager (CM) responsible for management of the available audio bandwidth. The CM should be aware at all time of the number of audio sessions that are established and of the CDR for audio packets. When a call is attempted that would commit an amount of traffic that exceeds the CDR for audio packets, then the call is denied with a message that all circuits are busy. This process is called the Call Admission Control (CAC) process.

Unfortunately, the CM sometimes is informed that an audio session has been terminated when in fact the audio session improperly continues after termination has been reported to the CM. It also is possible for network devices to either intentionally miss-mark non-audio packets as audio packets for higher priority, or network devices can be mistakenly plugged in to the wrong part of the network causing non-audio packets to be marked as audio packets. In either case, the non-audio packets marked as audio packets use up a portion of the audio bandwidth of which the CM is unaware. When the audio traffic reaches the audio CDR, the CAC process continues to admit new audio sessions so that audio traffic exceeds the audio CDR and audio packets are dropped.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure recognizes that in some cases audio packets are dropped even when bandwidth is available for other packet types under a different CDR. Therefore the present disclosure is directed to using this other available bandwidth for audio packets when the audio traffic approaches the audio CDR.

Disclosed are systems, methods, and computer-readable storage media for managing the problem of dropped audio packets in a packet network by adapting audio packet marking. A system configured to practice the method includes a transmitting device that receives a triggering event signal indicating that audio marked packet traffic in the packet network has exceeded a capacity limit. Upon receiving the triggering event signal, the transmitting device transmits audio packets marked as non-audio packets through the packet network. The triggering event signal, for example, is generated when the audio marked packet traffic exceeds a dropped packet threshold, or when monitoring of the audio marked packet traffic through the packet network indicates that the audio marked packet traffic approaches a committed data rate (CDR) threshold.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

The present disclosure addresses the need in the art for improved network management approaches for handling audio packets. A brief discussion of foundational principles and examples are provided first, followed by a discussion of a basic general purpose system or computing device in FIG. 1 and an example network configuration which can be employed to practice the concepts disclosed herein. A more detailed description of methods and system will then follow.

When an enterprise gets a circuit from an internet service provider (ISP), the enterprise can carve up the circuit into sections reserved for audio, video, and data, for example. The number of sections can be one or more, but one common configuration is at least three sections. The size of the data rate, or bandwidth, of each respective section is called a committed data rate (CDR). The sections are referred to as classes of service (COS). For some ISPs, COS 1 is a strict priority section and is usually used for audio traffic, although the enterprise can change this configuration. For example, an enterprise can put video traffic in COS 1.

The enterprise indicates the class of service that is intended for each packet by marking each packet with a differentiated service code point (DSCP) marking that can be located in the packet header, for example. One commonly used value, 46, indicates that a packet belongs to COS 1. The actual value used is arbitrary. The enterprise should indicate to the ISP how the DSCP values map to the various COSs to obtain benefits from this approach.

The ISP implements the desired priority on customer edge (CE) network hardware such as routers for outgoing traffic and on provider edge (PE) network hardware such as routers for incoming traffic. The routers are typically located in the boundary between a high speed network (i.e. the enterprise local area network or LAN) and a more limited capacity link (the ISP's network). Thus, a packet sent from one enterprise location to another would traverse the network in this sequence: first enterprise LAN, first enterprise CE, ISP PE for the first enterprise, ISP cloud, PE for the second enterprise, second enterprise CE, second enterprise LAN.

The limited capacity links are between the CE and PE pairs. Because the first enterprise LAN is high speed compared to the CE/PE outgoing link, the CE must prioritize how it sends traffic and what traffic to send to the PE. The CE prioritizes traffic by forming queues for each COS. The CE inserts incoming packets into each queue based on the packet markings and transmits packets to the PE according to priorities that result in different levels of end-to-end performance for each COS. Essentially the same approach applies at the second enterprise because the ISP cloud is high speed compared to the PE/CE incoming link except that the PE prioritizes the traffic sent to the CE.

COS 1 is special because it confers strict priority to COS 1 marked packets. The ISP router that prioritizes enterprise traffic gives COS 1 packets a strict priority in that it will not transmit packets marked as non COS 1 unless the COS 1 queue is empty. Such preferential treatment is given to all COS 1 packets provided that the amount of COS 1 traffic does not exceed the COS 1 CDR. If COS 1 traffic exceeds the COS 1 CDR, the routers may simply drop the excess COS 1 traffic.

The other queues are treated jointly, but the router drains each of the remaining queues at a speed that is proportional to their respective CDR. For example, if the router has a COS 2 queue with CDR 20 and a COS 3 queue with CDR 10, the router will transmit twice as much traffic from the COS 2 queue than from the COS 3 queue, draining the COS 2 queue twice as fast as the COS 3 queue. This is how video packets in the COS 2 queue can get better treatment than data packets in the COS 3 queue, for example.

The queues other than COS 1 are also limited by their respective CDRs in a similar manner to the COS 1 queue, but the effect of their CDR is different than for the COS 1 queue. When the router receives too much traffic for a COS, it designates the excess traffic as "out of contract". Such "out of contract" packets are not necessarily dropped, but the service level agreement (SLA) contract with the ISP does not apply to them. Once a packet has been designated as in or out of contract, it is subject to a certain probability of being dropped depending on the designation and on how full the corresponding queue is.

Out of contract packets are simply more likely to get dropped than in contract packets. If the amount of incoming traffic approaches circuit capacity, at least a portion of the out of contract packets is very likely to be dropped.

Because of the priority associated with COS 1, the router does not hold COS 1 packets in a long backlog in a queue. The router basically transmits a COS 1 packet as soon as it arrives with a delay that consists of whatever the router hardware had already committed to transmit at the time the COS 1 packet arrived, which is typically a very insignificant delay. This leads to extremely low levels of jitter for packets in COS 1 because they are handled as they arrive. Jitter is an audio effect particularly noticeable in real-time audio applications such as voice over IP (VoIP) due to out-of-order arrival or high variability in transmission latency of audio packets.

As a result, in the scenarios outlined above, it is perfectly plausible to have packet loss in COS 1, but no packet loss in COS 2 and/or COS 3. This can indicate that the COS 1 CDR has been exceeded. It is also possible to have massive loss in COS 2 and/or COS 3 with no or minimal loss in COS 1. This can indicate that the amount of traffic received exceeds the circuit capacity but that the amount of COS 1 traffic is less than the COS 1 CDR. It is possible to have very little jitter in COS 1 and substantial jitter in COS 2 and/or COS 3. This can indicate heavy COS 2 and/or COS 3 traffic. Thus, even when there is loss in COS 1, the packets that do make it through experience very little jitter. Various embodiments based on an understanding of these principles shall be discussed herein. The disclosure now turns to FIG. 1.

Figure 1:
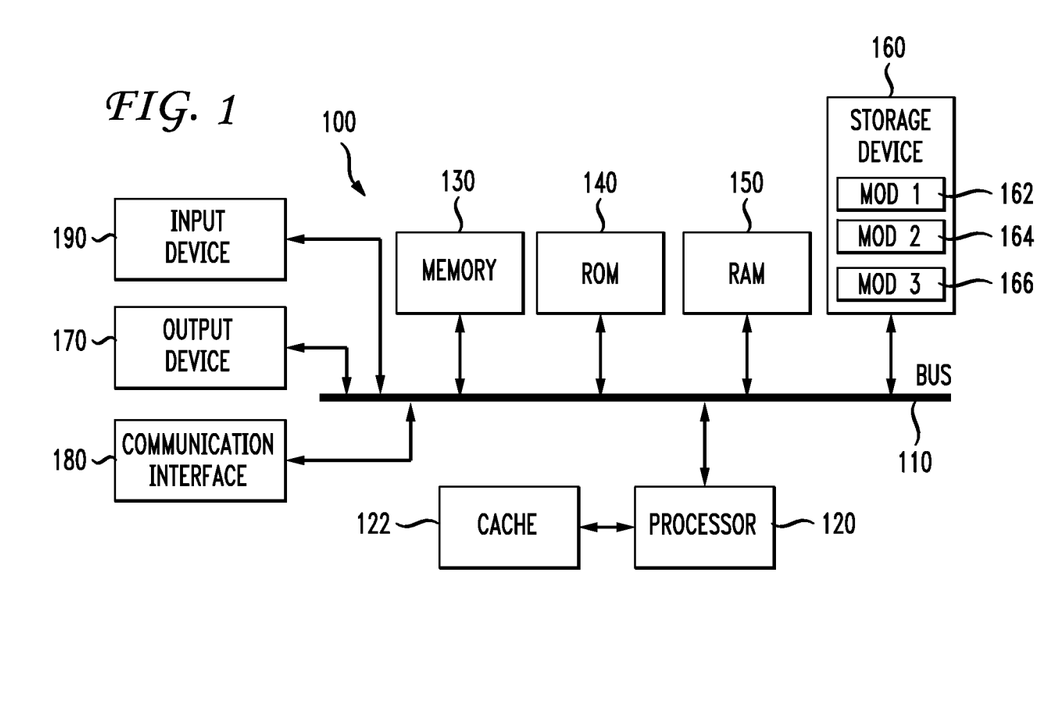
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics.

It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules (Mod1 162, Mod2 164 and Mod3 166), which are modules configured to control the processor 120. These modules may be stored on the storage device 160 and loaded into RAM 150 or memory 130 at runtime or may be stored as would be known in the art in other computer-readable memory locations.

Figure 2:
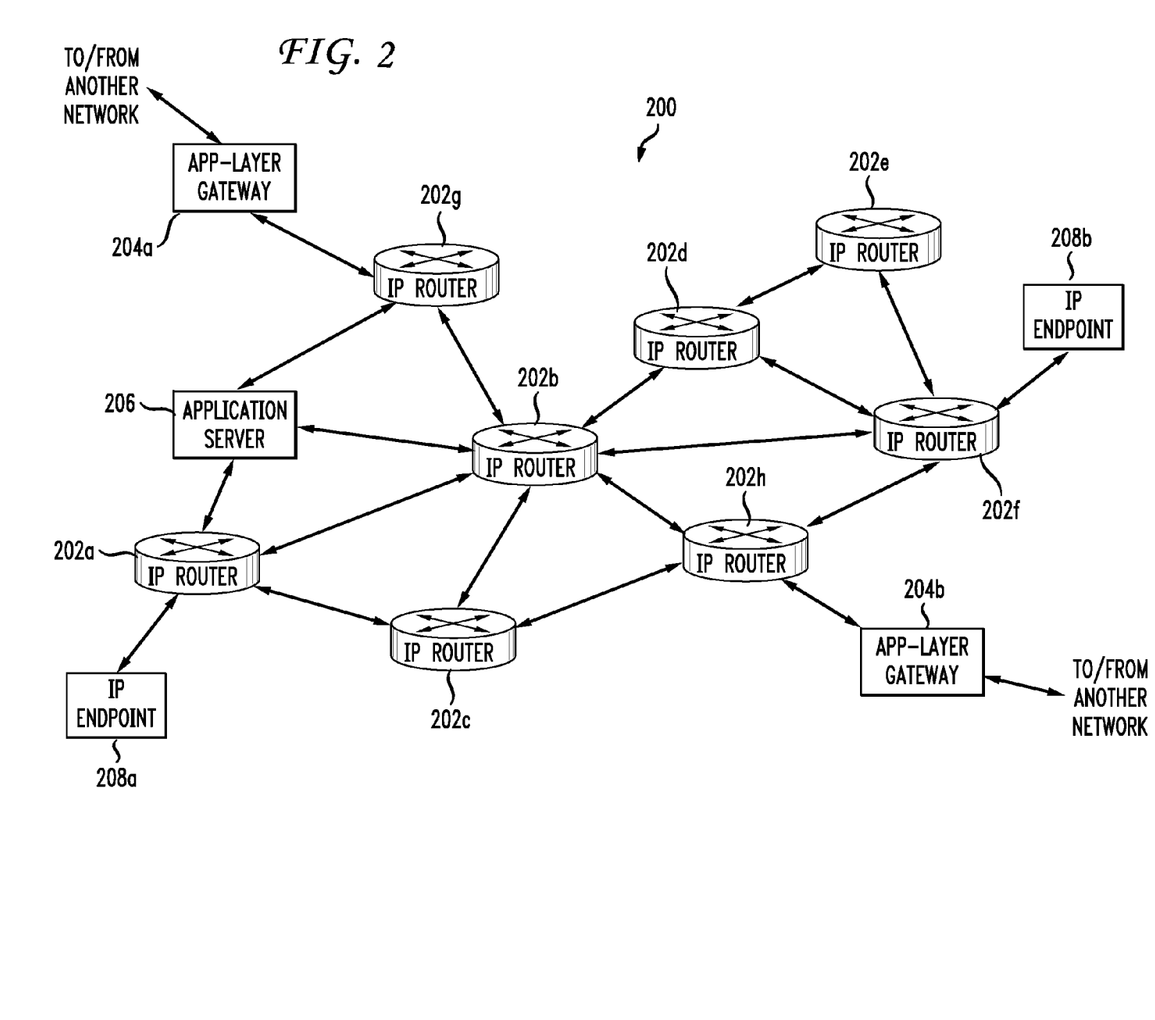
FIG. 2 illustrates an example network embodiment.

FIG. 2 illustrates an example telecommunications network embodiment 200. As shown in FIG. 2, telecommunications network 200 comprises application-layer gateways 204a, 204b, an application server 206, Internet Protocol (IP) endpoints 208a, 208b, and various interconnected IP routers 202a-202h. This particular configuration of an IP-based network is illustrative. The telecommunications network is not limited to an IP-based network and is not limited to this particular configuration of application-layer gateways 204a, 204b, IP routers 202a-202h, etc.

Each IP router 202a-202h is a device that receives IP packets via one or more incoming network links and forwards the received packets along one or more outgoing network links. Typically IP routers 202a-202h maintain dynamic routing tables that enable the routers to alter the paths by which traffic is transmitted through the network 200. IP routers 202a-202h can reroute network traffic along different paths through the network 200 over time in response to various conditions such as link failures, congested routes, toll charges, and so forth. A data source such as an IP endpoint 208a, 208b or a network transmission mechanism such as an IP router 202a-202h can mark certain packets according to their contents. For example, audio traffic is marked as audio packets, video traffic is marked as video packets, and data traffic is marked as data packets.

Application-layer gateways 204a, 240b are data-processing systems that are capable of providing one or more application-layer functions such as Voice over IP (VoIP), FTP, streaming video, Internet Protocol Television (IPTV), remote desktop services, and so forth. Moreover, application-layer gateways 204a, 240b are also capable of participating in the performing of one or more of the tasks described below and with respect to FIGS. 4-11.

Application server 206 is a data-processing system that provides one or more services to support a particular application such as VoIP or IPTV, and is also capable of participating in the performing of one or more of the tasks described below and with respect to FIGS. 4-11. In accordance with one illustrative embodiment, application server 206 provides VoIP services such as call setup between two or more Internet Protocol endpoints 208a, 208b, call modification, call termination, etc. The application server 206 can provide services for other applications as well, including videoconferencing, IPTV, instead of or in addition to VoIP.

Each IP endpoint 208a, 208b is a device such as an IP telephone, an IP headset, an IP handset, an IP softphone, or an IP conference phone that communicates with other devices over the network 200 in accordance with the Internet Protocol (IP). Moreover, IP endpoints 208a, 208b can also perform one or more of the tasks described below.

Figure 3:
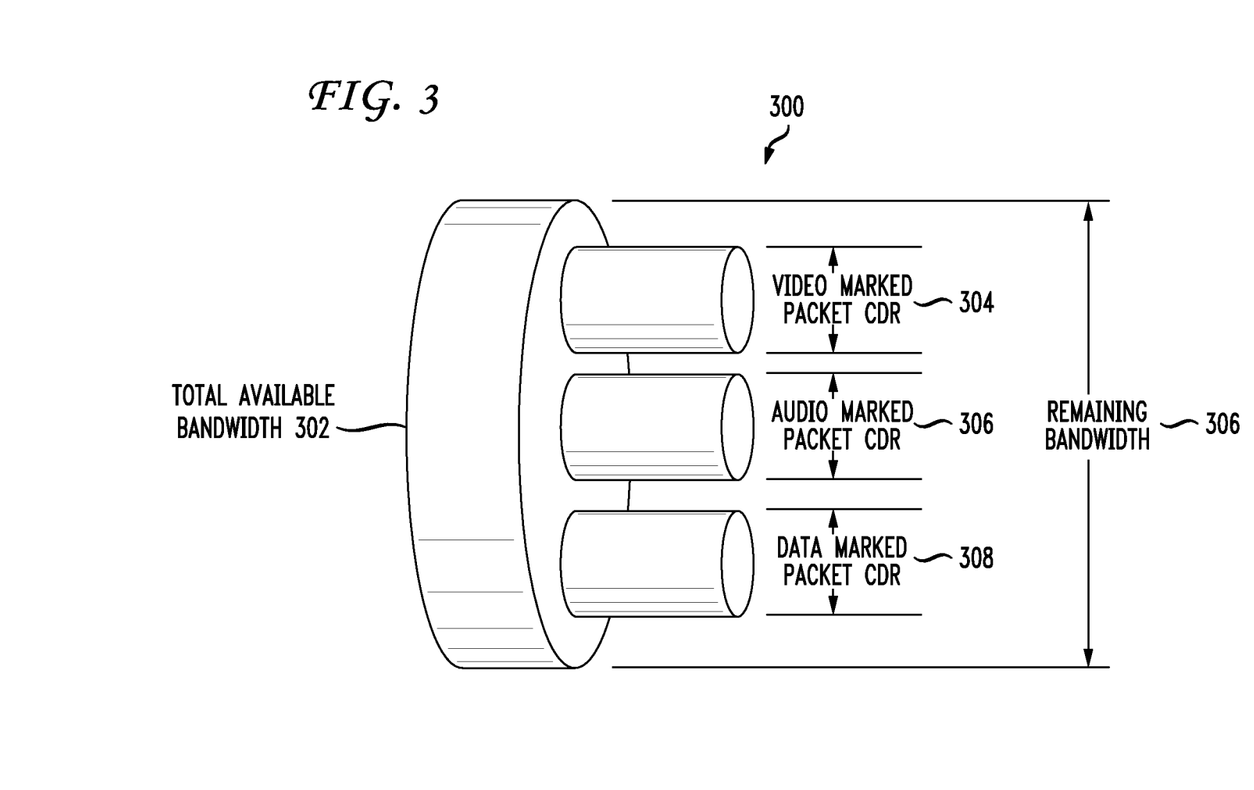
FIG. 3 illustrates an example committed data rate in a network.

FIG. 3 illustrates an example committed data rate 300 in a network. The committed data rate 300 can include a CDR 304 for video marked packets, a CDR 306 for audio marked packets, and a CDR 308 for data marked packets. The CDRs 304-308 can be allocated from the total available bandwidth 302 in the network. The remaining bandwidth 306 can be the remaining bandwidth available from the total available bandwidth 302 after the CDRs 304-308 are allocated.

The disclosure now returns to a discussion of management of a packet network to deal with the problem of audio packets being dropped when the audio traffic exceeds an audio CDR. It is desired to avoid audio packet loss without purchasing additional bandwidth. As described below with reference to FIGS. 4-11, this can be done by automatically adapting audio packet marking in a packet network.

Figure 4:
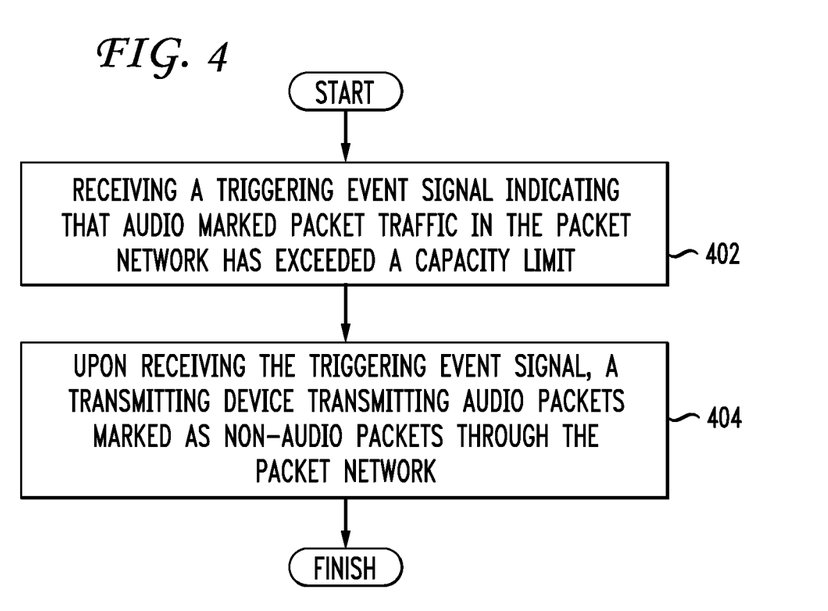
FIG. 4 illustrates an example method embodiment.

FIG. 4 illustrates an exemplary method embodiment for automatically adapting audio packet marking in a packet network. The system (100 in FIG. 1) receives a triggering event indicating that audio marked packet traffic in the packet network has exceeded a capacity limit (step 402 in FIG. 4). Upon receiving the triggering event signal, the system (100 in FIG. 1) transmits audio packets marked as non-audio packets through the packet network (step 404 in FIG. 4). While the audio packets are not sent high priority because they are not marked as audio packets, their late or out-of-order arrival provides "jitter" or other effects in the received signal, any of which is far favorable to cutting out, which is what dropped packets produce in a received signal. This approach degrades voice quality more gracefully than the current approach of dropping audio packets when the audio packet CDR is exceeded. This approach avoids audio packet loss by adapting audio packet markings to utilize bandwidth that is not being used but that would otherwise not be available to audio marked packets.

In a separate mechanism, the triggering event signal can be generated remotely at the receiving device or in a server in the packet network, or the triggering event signal can be manual or locally generated on the sending device. The triggering event signal can be generated manually, such as when a user is on a call and the other party says that the user's voice signal is cutting out. The user can manually switch the audio packet markings such as with a software or hardware switch in a handset or on a keypad.

In one aspect, the user can send a test tone with packets marked as audio and a test tone with packets marked as non-audio. The user or another party can select the transmission method that sounds better given the current network conditions. For example, when the transmitting device receives a triggering event signal automatically from a remote device or server in the packet network, the receiving device switches the audio packet markings to mark the audio packets as non-audio packets for a period of time. The user of the transmitting device, however, may switch the audio packet markings at any time from audio markings to non-audio markings, or from non-audio markings back to audio markings.

A remote receiving device may automatically generate the triggering event signal when it notices the missing audio packets. The triggering event signal may also be generated automatically by a central server that is monitoring packet network performance across the relevant WAN links in real time.

The switch from audio-marked packets to non-audio marked packets could be prescribed for a period of time that could be random so as to allow a device to revert to the audio queue in hope that whatever problem there was has disappeared. The period could be random to prevent a large number of devices from moving back to use of one or more audio queues across the relevant WAN links in unison and reproduce the original problem abruptly. Alternatively, the period could be determined based on an analysis of other flows in the system such that individual devices are moved back at specific moments to prevent the problem from reoccurring.

A related aspect is that by preventing audio packets from being dropped during congestion of the audio CDR, there is more of a need to preserve signaling during network congestion. Signaling represents little traffic but traffic that is often critical to the proper working of a telephony system. Thus, it has been recommended that signaling as well as media packets should be treated alike as COS 1. This disclosure recognizes that the reliability of the signaling should be enhanced further by always transmit signaling packets from both the audio queue and the data queue over a limited capacity link, all the time. Thus, each signaling packet is transmitted as an audio-marked packet and also as a duplicate non-audio marked packet (e.g., as a data-marked packet). Duplicate packets (when both make it) are discarded at the destination. This results in good performance and protect against the case where signaling packets are getting dropped because the COS 1 CDR is exceeded.

Figure 5:
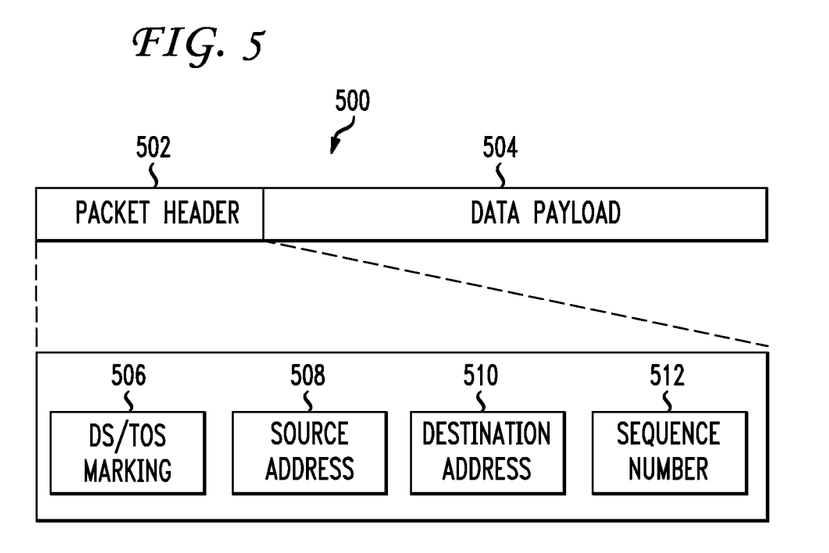
FIG. 5 illustrates a packet used in the network of FIG. 2.

FIG. 5 shows a typical packet 500 including a packet header 502 and data payload 504. The packet header 502 includes differentiated services (DS) or type of service (TOS) marking 506, a source address 508, a destination addresses 510, and sequence number 512. The DS or TOS marking 506 indicates whether or not the packet 500 is marked as an audio packet. The sequence number 512 enables the packet 500 to be received out-of-order and re-assembled in order with other packets of a packet stream, and also enables the destination device to recognize when a packet of the packet stream has been dropped during transmission to the destination device.

Figure 6:
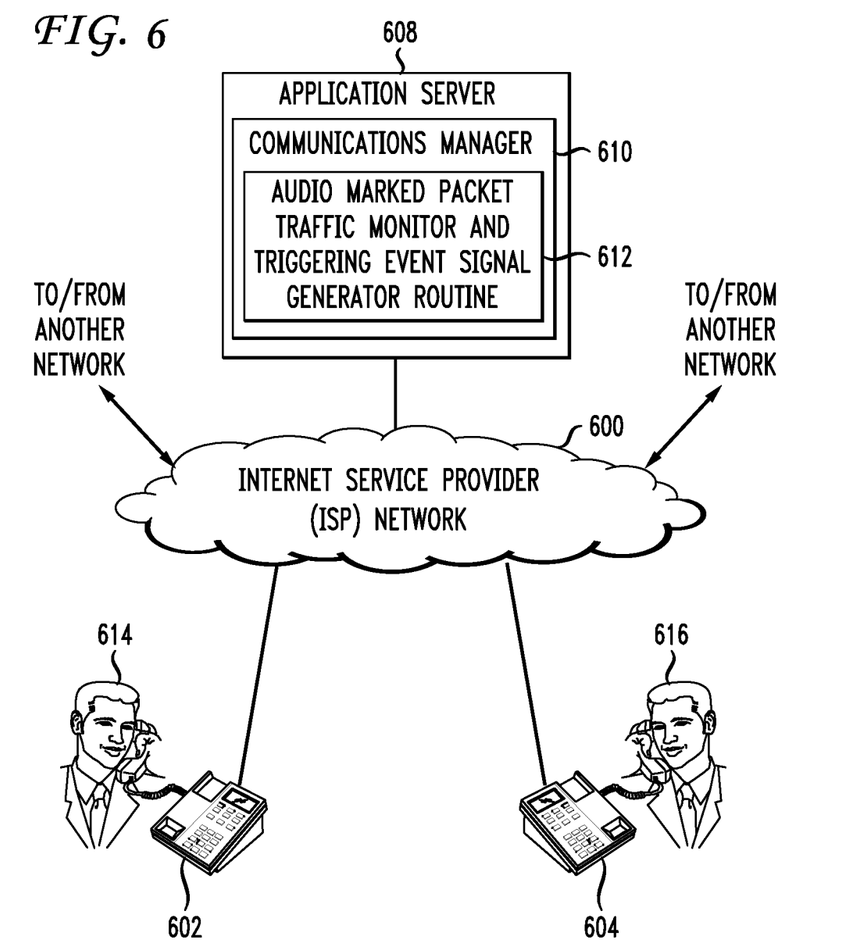
FIG. 6 illustrates a more specific example of the network embodiment.

FIG. 6 shows a specific example of the network embodiment introduced in FIG. 2. In FIG. 6, the internet service provider (ISP) network 600 has endpoint devices 602, 604 which are VoIP telephones operated by respective human users 614 and 616. The ISP network 600 is also linked to an application server 608 including a communications manager (CM) 610. The CM 610 includes an audio marked packet traffic monitor and triggering event signal generator routine 612, as further described below with reference to FIG. 8.

Figure 7:
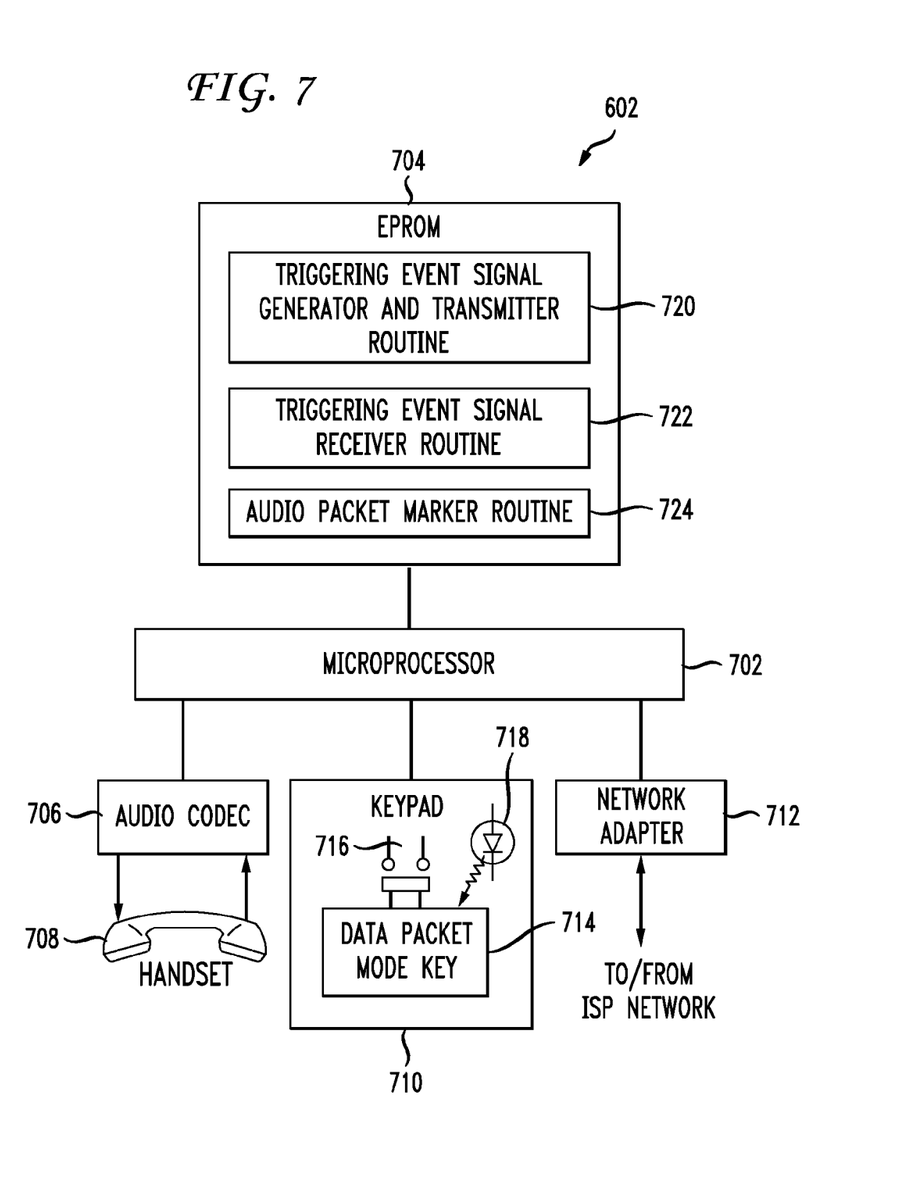
FIG. 7 illustrates components in one of the VoIP telephones in FIG. 6.

FIG. 7 shows in more detail components of the VoIP telephone 602. The VoIP telephone includes a microprocessor 702, an electrically-programmable read-only memory (EPROM) 704, an audio codec 706 linking a handset 708 to the microprocessor 702, a keypad 710, and a network adapter 712. The keypad 710 (or alternatively the handset 708) includes a data packet mode key 714 actuating a push-button switch 716. The data packet mode key 714 is illuminated by a light-emitting diode 718 when the telephone 602 has been switched to the "data packet mode" in which the microprocessor 702 marks audio packets as data packets for transmission by the network adapter 712 to the ISP network (600 in FIG. 6).

The EPROM 704 includes a triggering event signal generator and transmitter routine 720, as further described below with reference to FIG. 9. The EPROM 704 also includes a triggering event signal receiver routine 722, as further described below with reference to FIG. 10, and an audio packet marker routine 724, as further described below with reference to FIG. 11.

Figure 8:
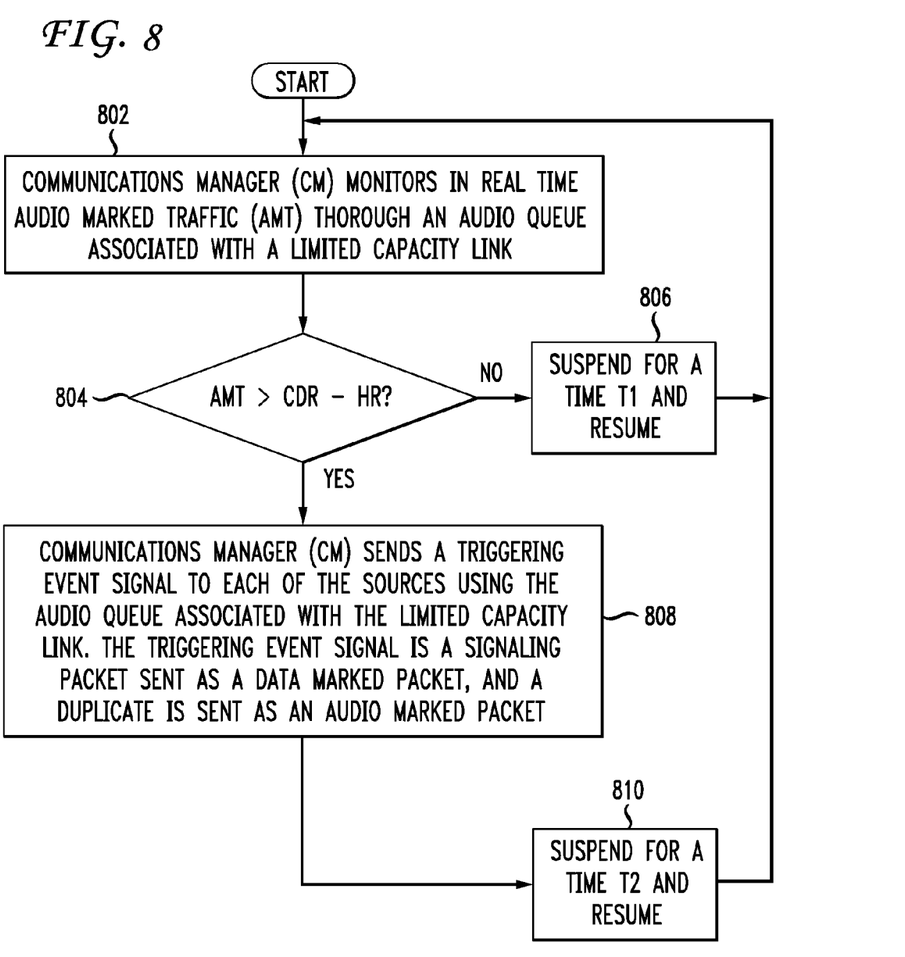
FIG. 8 illustrates a flowchart of an audio marked packet traffic monitor and triggering event signal generator routine introduced in FIG. 6.

FIG. 8 shows a flowchart of the audio marked packet traffic monitor and triggering event signal generator routine (612 in FIG. 6). In a first step 802 in FIG. 8, the communications manager (CM) monitors in real time audio marked traffic (AMT) through an audio queue associated with a limited capacity link. Typically, such a limited capacity link is between a provider edge (PE) server and a customer edge server (CE) in the ISP network (600 in FIG. 6). In step 804, the AMT is compared to the difference between the audio CDR for the limited capacity link, and a certain headroom (HR) in order to detect whether the AMT is approaching the CDR. If the AMT does not exceed the difference between the audio CDR and HR, then execution branches from step 804 to step 806. In step 806 the task of FIG. 8 is suspended for a duration of time T1, and when execution of the task resumes, execution loops from step 806 back to step 802.

In step 804, if the ATM exceeds the difference between the audio CDR and HR, then execution continues from step 804 to step 808. In step 808, the communications manager (CM) sends a triggering event signal to each of the sources using the audio queue associated with the limited capacity link. The triggering event signal is a signaling packet sent as a data marked packet, and a duplicate is sent as an audio marked packet. The signaling packet could specify a respective time at which the source should revert back to transmitting audio-marked packets. In this case the CM specifies respective periods of time that are different for multiple sources to prevent the multiple sources from simultaneously discontinuing transmission of audio packets marked as non-audio packets through the network. This would help prevent dropped audio packets from occurring when the sources revert back to transmitting audio marked packets. After step 808, execution of the task of FIG. 8 is suspended for a duration of time T2, and once execution of the task resumes, execution loops from step 810 back to step 802. The duration of time T2 is set larger than the duration of time T1.

Figure 9:
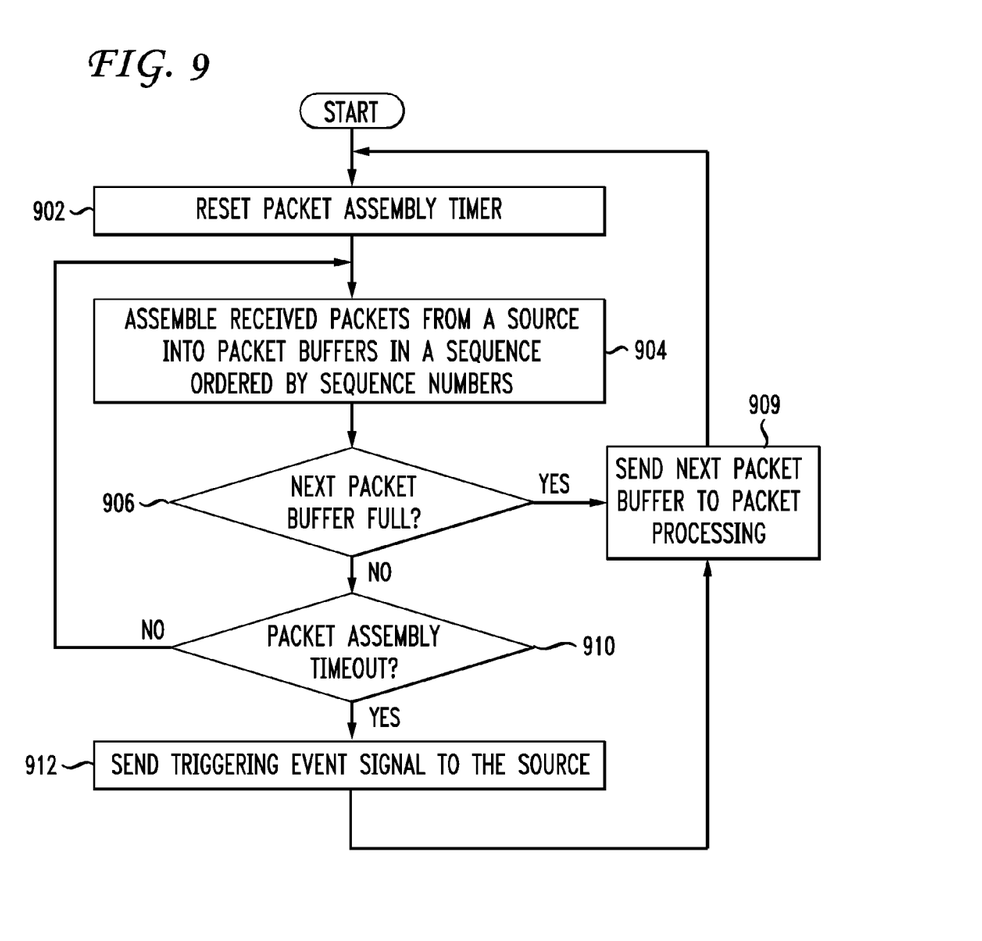
FIG. 9 illustrates a flowchart of a triggering event signal generator and transmitter routine introduced in FIG. 7.

FIG. 9 shows a flowchart of the triggering event signal generator and transmitter routine (720 in FIG. 7). In a first step 902 of FIG. 9, a packet assembly timer is reset. Next, in step 904, received packets from a source are assembled into packet buffers in a sequence ordered by sequence numbers in the packet headers. In step 906, if a next packet buffer is full, then execution branches to step 909 to send the next packet buffer to packet processing. Execution then loops from step 909 back to step 902.

In step 906, if the next packet buffer is not full, then execution continues from step 906 to step 910. In step 910, if there has not been a packet assembly timeout (i.e., the packet assembly timer has not expired, for example by being decremented to zero) then execution loops from step 910 back to step 904. Otherwise, execution continues from step 910 to step 912. In step 912, a triggering event signal is sent to the source. Execution loops from step 912 back to step 902.

Figure 10:
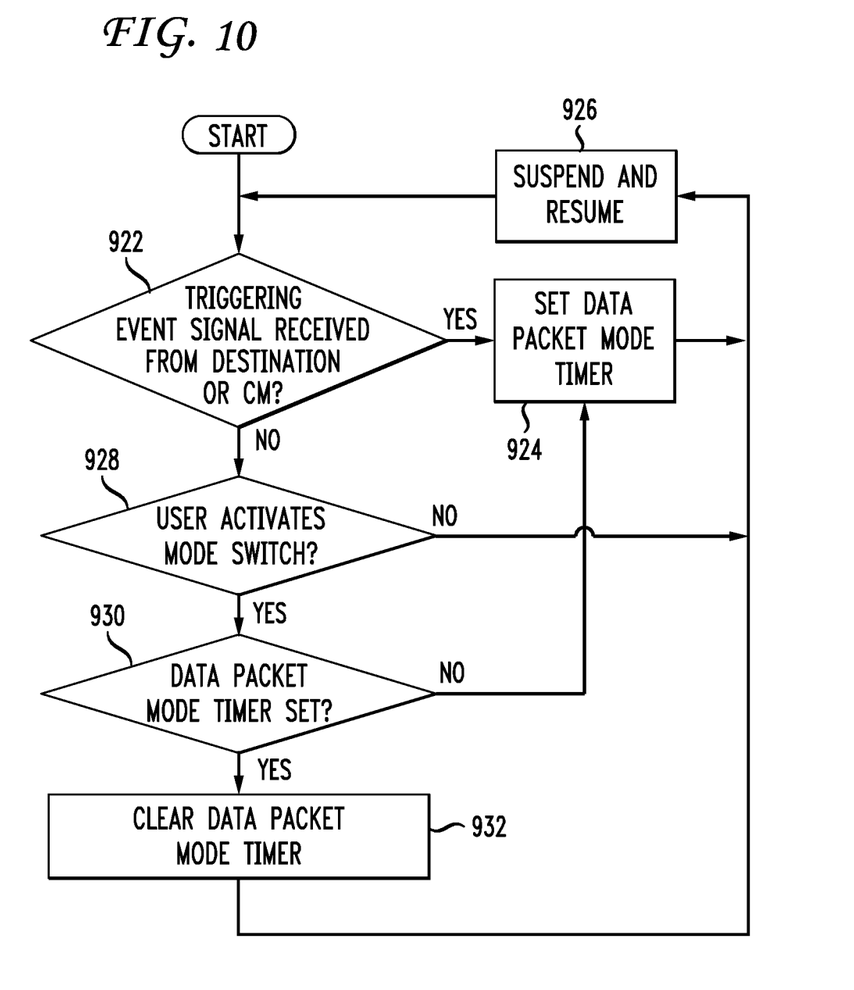
FIG. 10 illustrates a flowchart of a triggering event signal receiver routine introduced in FIG. 7.

FIG. 10 shows a flowchart of the triggering event signal receiver routine (722 in FIG. 7). In a first step 922, if a triggering event signal is received from the destination device or from the communications manager (CM), then execution branches to step 924. In step 924, a data packet mode timer is set. The period of the data packet mode could have a random variation, or the period could be set with a time-out duration received from the CM, so as to prevent multiple source devices from simultaneously discontinuing transmission of audio packets marked as non-audio packets through the network. Execution continues from step 924 to step 926. In step 926, execution is suspended for a time and then resumes, and execution loops from step 926 back to step 922.

In step 922, if a triggering event signal is not received from the destination device or from the communications manager (CM), then execution continues to step 928. In step 928, if the user has not activated the data packet mode switch (716 in FIG. 7), then execution branches from step 928 to step 926. Otherwise, if the user activates the data packet mode switch, then execution continues from step 928 to step 930. In step 930, if the data packet mode timer is not set, execution branches form step 928 to step 924. Otherwise, if the data packet mode timer is set, then execution continues from step 930 to step 932. In step 932, the data packet mode timer is cleared, and execution continues from step 930 to step 932. In this fashion, when the source device receives a triggering event signal from the destination device or the communications manager (CM), the source device is set in the data packet mode for at least the time of the data packet mode timer unless the user of the source device activates the data packet mode switch. If the user activates the data packet mode switch, then the source device toggles the data packet mode from on to off, or from off to on.

Figure 11:
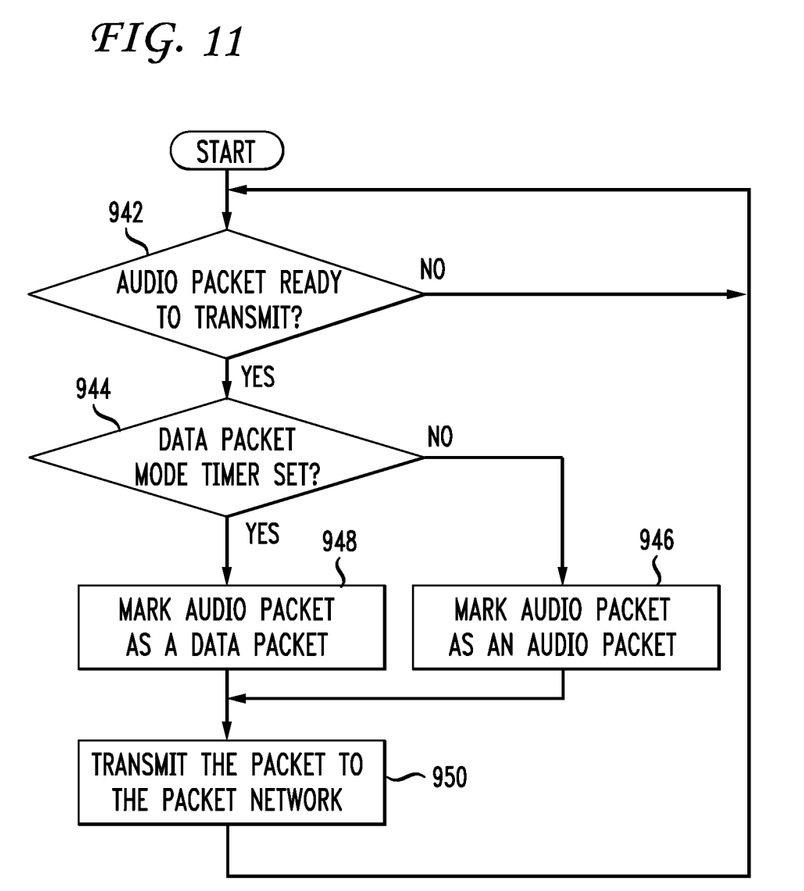
FIG. 11 illustrates a flowchart of an audio packet marker routine introduced in FIG. 7.

FIG. 11 shows a flowchart of the audio packet marker routine (724 in FIG. 7). In a first step 942 of FIG. 11, once an audio packet is ready to transmit, execution continues to step 944. In step 944, if the data packet mode timer is not set, then execution branches to step 946. In step 946, the audio packet is marked as an audio packet, and then execution continues to step 950. In step 944, if the data packet mode timer is set, then execution continues to step 948. In step 948, the audio packet is marked as a data packet, and then execution continues to step 950. In step 950, the packet is transmitted from the source device to the packet network, and then execution loops from step 950 back to step 942 for transmission of the next audio packet in the packet stream.

Embodiments within the scope of the present disclosure may also include tangible and/or non-transitory computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method of adapting audio packet marking in a packet network, the method performed by a data processor executing computer instructions stored on a non-transitory computer readable storage medium to perform operations comprising:
   (a) receiving, at a plurality of transmitting devices, a triggering event signal indicating that audio marked packet traffic in the packet network has exceeded a capacity limit;
   (b) upon receiving the triggering event signal in step (a), transmitting, via each transmitting device of the plurality of transmitting devices, audio packets marked as non-audio packets through the packet network for a period of time after receiving the triggering event signal; and
   (c) after the period of time, discontinuing the transmission of the audio packets marked as non-audio packets through the packet network and instead transmitting audio packets marked as audio packets through the packet network,
   wherein the period of time is selected to vary among the plurality of transmitting devices to prevent the plurality of transmitting devices from simultaneously discontinuing transmission of the audio packets marked as non-audio packets through the network.

2. The method as claimed in claim 1, which further includes generating the triggering event signal when the audio marked packet traffic exceeds a dropped packet threshold.

3. The method as claimed in claim 1, wherein at least one of the plurality of transmitting devices is a telephone, and step (a) of receiving the triggering event signal is performed by sensing that a user of the telephone has activated a switch of the telephone.

4. The method as claimed in claim 1, which further includes at least one of the plurality of transmitting devices transmitting the audio packets marked as non-audio packets through the packet network to a receiving device, and the receiving device generating the triggering event signal upon detecting that the one of the plurality of transmitting devices has transmitted dropped audio marked packets to the receiving device and the dropped audio marked packets were not received by the receiving device.

5. The method as claimed in claim 1, which further includes at least one of the plurality of transmitting devices transmitting signaling packets marked as non-audio packets through the packet network and transmitting duplicates of the signaling packets marked as audio packets through the packet network.

6. The method as claimed in claim 1, which further includes a network server monitoring the audio marked packet traffic and generating the triggering event signal when the audio marked packet traffic approaches a committed data rate (CDR) threshold.

7. A system for adapting audio packet marking in a packet network, the system comprising:
   a plurality of transmitting devices configured for transmitting packets through the packet network, and each transmitting device from the plurality of transmitting devices comprising a data processor and a non-transitory computer-readable storage medium storing computer instructions that, when executed by the data processor, perform operations comprising:
      (a) receiving a triggering event signal indicating that audio marked packet traffic in the packet network has exceeded a capacity limit;
      (b) upon receiving the triggering event signal in step (a), the transmitting device transmitting audio packets marked as non-audio packets through the packet network for a period of time after receiving the triggering event signal; and
      (c) after the period of time, discontinuing the transmission of the audio packets marked as non-audio packets through the packet network and instead transmitting audio packets marked as audio packets through the packet network,
   wherein the period of time varies among the plurality of transmitting devices to prevent the plurality of transmitting devices from simultaneously discontinuing transmission of the audio packets marked as non-audio packets through the network.

8. The system as claimed in claim 7, wherein the triggering event signal indicates that the audio marked packet traffic has exceeded a dropped packet threshold.

9. The system as claimed in claim 7, which further includes a receiving device linked to at least one transmitting of the plurality of transmitting devices through the packet network for receiving the audio packets marked as non-audio packets from the at least one transmitting device and for generating the triggering event signal upon detecting that the at least one transmitting device has transmitted dropped audio marked packets to the receiving device and the dropped audio marked packets were not received by the receiving device.

10. The system as claimed in claim 7, wherein at least one of the plurality of transmitting devices further includes a transmitter for transmitting signaling packets marked as non-audio packets through the packet network and transmitting duplicates of the signaling packets marked as audio packets through the packet network.

11. The system as claimed in claim 7, which further includes a network server monitoring the audio marked packet traffic and generating the triggering event signal when the audio marked packet traffic approaches a committed data rate (CDR) threshold.

12. A non-transitory computer-readable storage medium storing computer instructions that, when executed by a data processor in each transmitting device from a plurality of transmitting devices, performs audio packet marking in a packet network by operations comprising:

(a) receiving a triggering event signal indicating that audio marked packet traffic in the packet network has exceeded a capacity limit;

(b) upon receiving the triggering event signal in step (a), transmitting, via the transmitting device audio packets marked as non-audio packets through the packet network for a period of time after receiving the triggering event signal; and (c) after the period of time, discontinuing the transmission of the audio packets marked as non-audio packets through the packet network and instead transmitting audio packets marked as audio packets through the packet network, wherein the period of time is selected to vary among the plurality of transmitting devices to prevent the plurality of transmitting devices from simultaneously discontinuing transmission of the audio packets marked as non-audio packets through the network.

13. The non-transitory computer-readable storage medium as claimed in claim 12, wherein at least one of the plurality of transmitting devices is a telephone, and step (a) of receiving the triggering event signal is performed by sensing that a user of the telephone has activated a switch of the telephone.

14. The non-transitory computer-readable storage medium as claimed in claim 12, wherein at least one of the plurality of transmitting devices is a telephone, and step (a) of receiving the triggering event signal is performed by receiving a packet from another telephone.

15. The non-transitory computer-readable storage medium as claimed in claim 12, wherein at least one of the plurality of transmitting devices is a telephone, and step (a) of receiving the triggering event signal is performed by receiving a packet from a network server in the packet network.

* * * * *